June 22, 1937.  A. M. JONGENEEL  2,084,398
BEET TOPPER
Filed Aug. 12, 1936   2 Sheets-Sheet 2
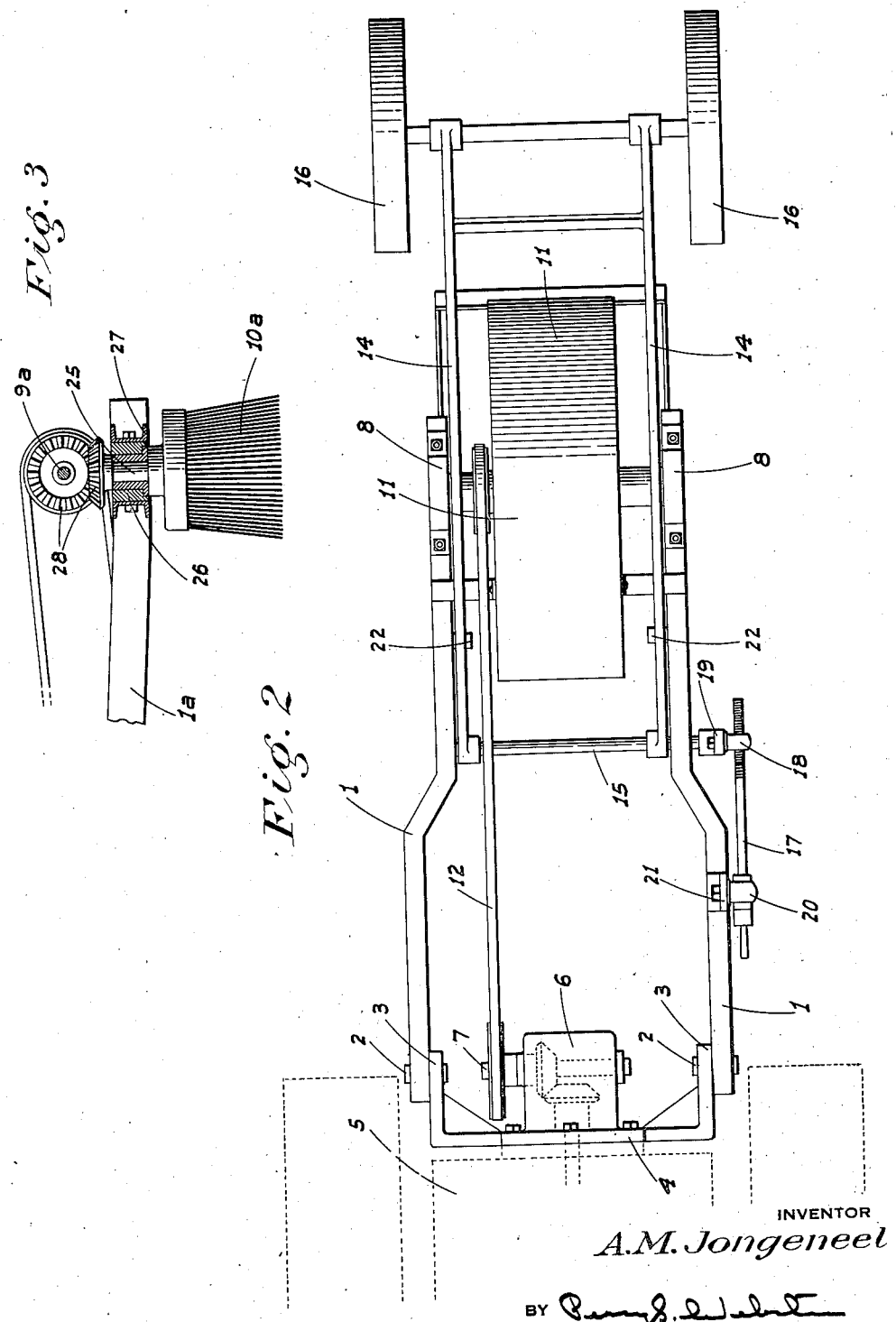
INVENTOR
A.M. Jongeneel
BY
ATTORNEY Patented June 22, 1937

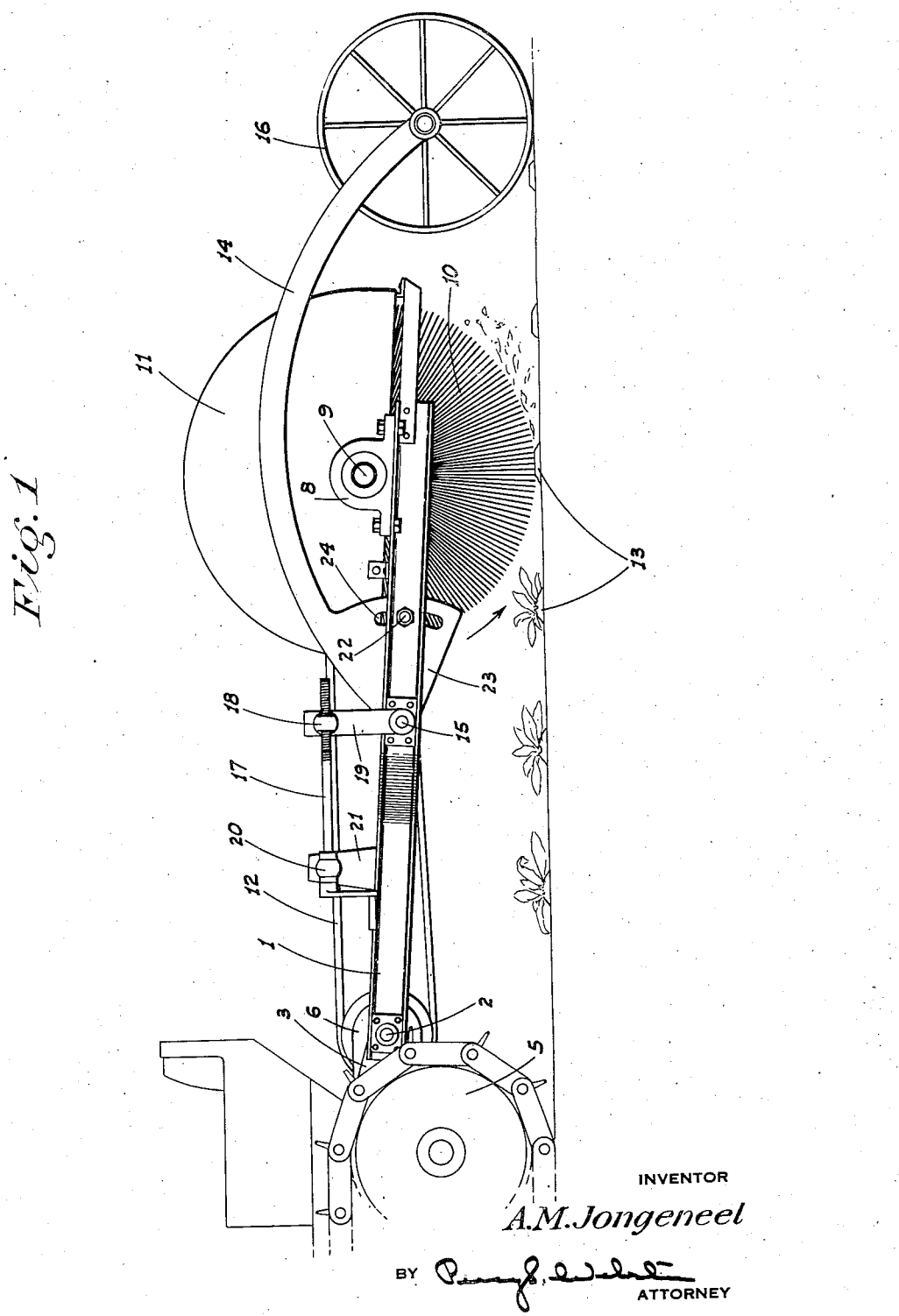

2,084,398

UNITED STATES PATENT OFFICE 2,084,398

BEET TOPPER

Albert M. Jongeneel, Walnut Grove, Calif., assignor of twenty per cent to George P. du Bose, Stockton, Calif., and forty per cent to Frank B. Haines, Isleton, Calif.

Application August 12, 1936, Serial No. 95,535

8 Claims. (Cl. 55—107)

The invention relates to machines for topping beets while in the ground; my principal object being to provide a machine for the purpose adapted to be pulled or pushed along the rows of beets in the field and arranged so that the leaves will be positively removed from the beets and the crowns of the latter topped and cleanly scoured or buffed to a pre-determined depth; all in a simultaneous operation and with the movement of the machine along the row.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of my improved machine as in operation.

Figure 2 is a top plan view of the same.

Figure 3 is a fragmentary view showing a modified form of topping brush.

Referring now more particularly to the characters of reference on the drawings, and particularly at present to Figs. 1 and 2, the machine comprises a pair of spaced side frames 1. At their forward end the frames are pivoted as at 2 on ears 3 projecting from an adapter plate 4. This plate is secured on the rear end of a tractor indicated at 5, in connection with the power take-off unit 6 thereof, and so that the pivots 2 are in line with the power take-off shaft 7.

Bearing boxes 8 are mounted on the frames 1 adjacent their rear end and supporting a transverse shaft 9. Fixed on this shaft is a rotary brush consisting of stiff but resilient bristles 10 of metal or other suitable material mounted in a suitable hub, the width of the brush being sufficient to extend at least over one beet though it may be made sufficiently wide to simultaneously engage beets in adjacent rows if desired. To provide a safeguard against possible harm to the workers, the upper portion of the brush may, if desired, be enclosed in a hood 11.

The brush is rotated at a suitable speed from the shaft 7 by any convenient drive means such as a V-belt drive 12 (or a chain) between said shaft and the brush shaft.

To support the frames at their rear end and maintain the bottom of the brush at a given distance from the ground at a proper level to top the beets 13, I provide a pair of arms 14 disposed at transverse planes adjacent the frames 1. These are fixed at their forward end on a shaft 15 journaled in said frames ahead of the brush and extend rearwardly of the frames a certain distance having ground-engaging wheels 16 at their rear end. The gauge of these wheels is such that they travel in straddling relation to a row of beets.

To relatively swing the arms about the shaft 15 so as to raise and lower the rear end of the frames 1 and the brush mounted thereon, I apply suitable turning means to the shaft 15. In the present instance such means is shown as comprising a horizontal jack screw 17. This is threaded through a swivel nut 18 mounted on an arm 19 upstanding from the shaft 15, and turns in another swivel nut 20 mounted on a bracket 21 upstanding from the adjacent frame 1 at the head of the arm 19. To secure the arms against movement when once set and to take the strain off the screw, I provide clamping bolts 22 which engage the frames 1 and plates 23 formed with the arms 14 and passing through arcuate slots 24 in the latter disposed concentric with the shaft 15.

In operation the tractor is drawn along the ground in line with the row of beets to be topped, and the arms 14 are set according to the extent of projection of such beets from the ground so that the brush is at the proper level to top the beets. With the brush driven at a relatively high speed and so that the lower front side of the same travels down or rearwardly, all the leaves of each beet as it is encountered, will be completely removed from the beet and the latter topped by the scouring or buffing action of the bristles of the rapidly revolving brush.

In the type of device shown in Fig. 3 the construction and operation is in general the same as above described. The brush 10a however is disposed on a vertical instead of a horizontal axis and of course rotates in a horizontal plane. The axial shaft 25 of the brush is vertical in a box 26 supported from cross members 27 of the frames 1a and is driven from the transverse frame and mounted shaft 9a by suitable direction changing gearing 28.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A beet topper comprising a frame structure adapted to be moved along the ground over a row of beets, a driven rotary brush to engage the beet tops mounted on the frame structure and means to positively adjust the level of the brush at the bottom relative to the ground.

2. A device as in claim 1, in which the bristles of the brush are of relatively stiff but resilient material.

3. A beet topper comprising side frames, means pivotally supporting the frames at one end from a draft device, means supporting the frames at the opposite end for vertical adjustment relative to the ground, and a rotary driven topping brush mounted on the frames adjacent said opposite end.

4. A beet topper comprising side frames, means pivotally supporting the frames at one end from a draft device, a rotary driven topping brush mounted on the frames adjacent the opposite end thereof, ground engaging wheels adjacent said opposite end of the frames, arms on one end of which said wheels are mounted, pivotal connection means between the arms at their opposite end and the frames, and means between the frames and arms to swing the frames about their pivotal support as an axis.

5. A structure as in claim 4, with additional means between the frames and arms to clamp the frames against movement when once set by the operation of the frame swinging means.

6. A plant topping machine comprising a supporting frame adapted to be drawn along the ground, and a driven rotary brush mounted on said frame; the axis of the brush being vertically disposed and the bristles of the brush depending for engagement with the plant tops.

7. A structure as in claim 6 in which the lower edges of the brushes all lie in substantially a common horizontal plane.

8. A plant topper comprising a supporting frame relatively movable to the plants to be topped, and a driven rotary brush mounted on said frame; the axis of the brush being substantially parallel to the axis of the plants and the bristles of the brush extending toward the plants for engagement with the tops thereof.

ALBERT M. JONGENEEL.